United States Patent [19]

Peloquin

[11] Patent Number: 5,781,506

[45] Date of Patent: Jul. 14, 1998

[54] METHOD AND APPARATUS FOR FREQUENCY FILTERING USING AN ELASTIC FLUID-FILLED CYLINDER

[75] Inventor: Mark S. Peloquin. Uncasville, Conn.

[73] Assignee: The United States of America as represented by the Secretary of the Navy, Washington, D.C.

[21] Appl. No.: 865,151

[22] Filed: May 29, 1997

[51] Int. Cl.[6] .................................................. H04R 17/00

[52] U.S. Cl. ........................ 367/135; 367/153; 367/154; 367/106; 367/130

[58] Field of Search .................................. 367/135, 136, 367/106, 130, 88, 901, 153, 154

[56] References Cited

U.S. PATENT DOCUMENTS 5,532,979  7/1996  Hansen et al. ........................ 367/106
5,550,791  8/1996  Peloquin ............................... 367/153

*Primary Examiner*—Daniel T. Pihulic
*Attorney, Agent, or Firm*—Michael J. McGowan; James M. Kasischke; Prithvi C. Lall

[57] ABSTRACT

A method and system are provided for frequency filtering compressional wave energy. An elastic cylinder is filled with a fluid that is selected based on a fluid density $\rho_i$ and a dilatational wave phase velocity $c_i$ thereof. When the elastic cylinder so-filled is subjected to a compressional wave propagating in a fluid environment, a first radial resonance frequency of the elastic cylinder is controlled by the fluid density $\rho_i$ and the dilatational wave phase velocity $c_i$. Further tuning of the first radial resonance frequency can be achieved by adjusting the radial wall thickness of the elastic cylinder.

20 Claims, 2 Drawing Sheets

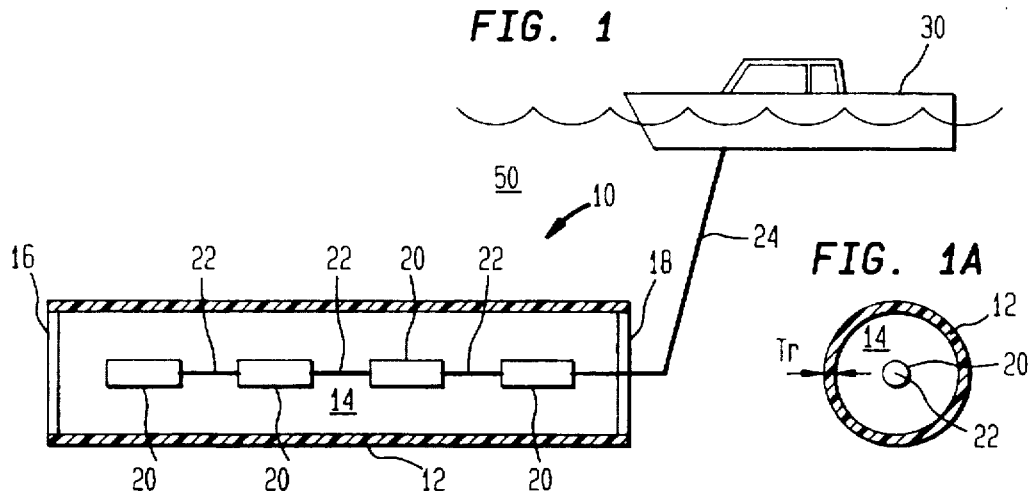
FIG. 1
FIG. 1A
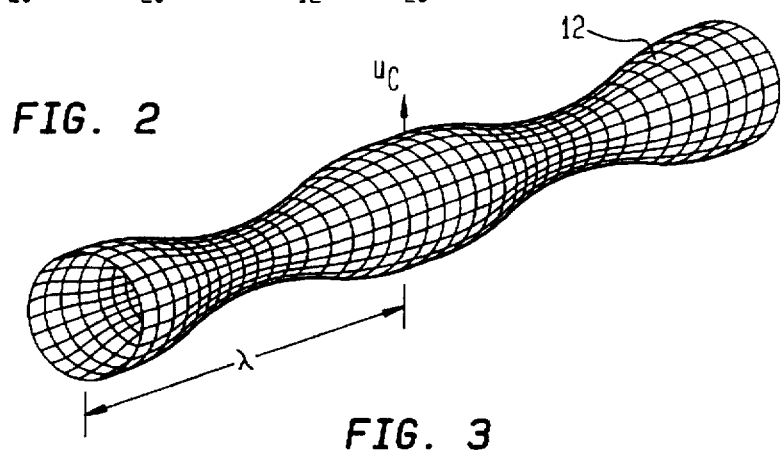
FIG. 2
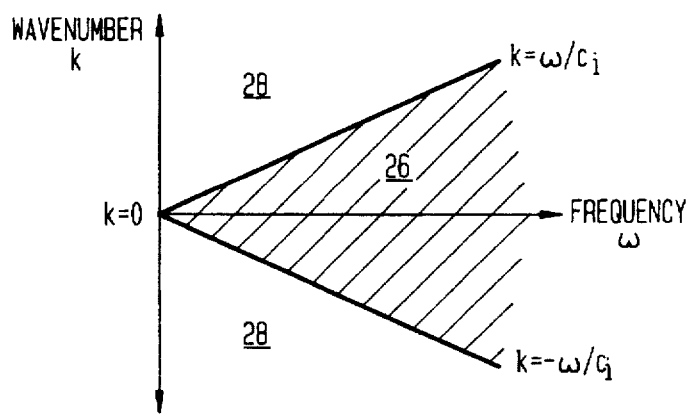
FIG. 3
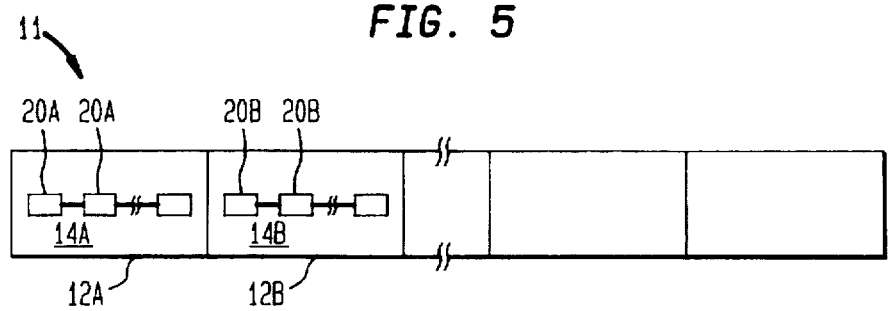
FIG. 5

METHOD AND APPARATUS FOR FREQUENCY FILTERING USING AN ELASTIC FLUID-FILLED CYLINDER

STATEMENT OF GOVERNMENT INTEREST

The invention described herein may be manufactured and used by or for the Government of the United States of America for Governmental purposes without the payment of any royalties thereon or therefor.

CROSS-REFERENCE TO RELATED PATENT APPLICATIONS

This patent application is co-pending with one related patent application entitled "OPTIMIZING THE COMPRESSIONAL WAVE ENERGY RESPONSE OF AN ELASTIC FLUID-FILLED CYLINDER" U.S. patent application Ser. No. 08/870,263, by the same inventor as this patent application.

BACKGROUND OF THE INVENTION

(1) Field of the Invention

The present invention relates generally to frequency filtering, and more particularly to a method and apparatus for mechanically filtering in the frequency domain unwanted pressure fields impinging on an elastic fluid-filled cylinder (such as those used in towed arrays) using the elastic fluid-filled cylinder.

(2) Description of the Prior Art

Towed acoustic arrays are used in a variety of commercial and military applications. For example, towed arrays are used in seismic survey applications as well as in antisubmarine warfare applications. In general, a towed array is used to measure a pressure field propagating in a fluid environment. A towed array typically consists of a plurality of hydrophones encased within a fluid-filled elastic cylinder. The fluid used to fill the elastic cylinder is matched to the outside fluid environment so that pressure fields are not attenuated as they are transmitted from the outside fluid environment to the fill-fluid surrounding the hydrophones in the array.

The individual hydrophone channels respond to the entire frequency spectrum of pressure fields that exist in the ocean, i.e., frequencies up to tens of thousands of hertz. However, this range of frequencies is larger than the typical towed array can process effectively because an array has a maximum operating frequency above which it begins to alias energy. The Nyquist sampling criteria states that two samples per wavelength are needed in order to extract full amplitude and phase information about the signal being measured. Since the channel spacing in an array is fixed at a distance d, the relationship between channel spacing and the minimum wavelength $\lambda_{MIN}$ of the pressure signal that can be measured is $$d \leq \frac{\lambda_{MIN}}{2} \quad (1)$$

The relationship between wavelength, frequency and wave speed c is $$\lambda = \frac{c}{f} \quad (2)$$

Combining the above equations and solving for $f_{MAX}$ which is the maximum frequency that the array can process without aliasing gives $$f_{MAX} \leq \frac{c}{2d} \quad (3)$$

All energy above this maximum frequency must be filtered electrically or mechanically in order to prevent aliasing.

SUMMARY OF THE INVENTION

Accordingly, it is an object of the present invention to provide a method and apparatus that operates to filter out unwanted pressure fields that impinge on a fluid-filled elastic cylinder.

Another object of the present invention is to provide a method and apparatus that operates as a low-pass filter to reduce unwanted pressure fields measured by the hydrophones of a towed array.

Other objects and advantages of the present invention will become more obvious hereinafter in the specification and drawings.

In accordance with the present invention, a method and system are provided for frequency filtering compressional wave energy. An elastic cylinder is filled with a fluid that is selected based on a fluid density $\rho_i$ and a dilatational wave phase velocity $c_i$ thereof. The elastic cylinder so-filled is immersed in a fluid environment defined by a fluid density $\rho_o$ and a dilatational wave phase velocity $c_o$. When the elastic cylinder so-filled is subjected to a compressional wave propagating in the fluid environment, a first radial resonance frequency of the elastic cylinder is controlled by the fluid density $\rho_i$ and the dilatational wave phase velocity $c_i$. For example, the first radial resonance frequency increases when the fluid is selected such that a product $\rho_i c_i$ is increased relative to a product $\rho_o c_o$. The first radial resonance frequency decreases when the fluid is selected such that a product $\rho_i c_i$ is decreased relative to a product $\rho_o c_o$. If the fluid is selected such that a product $\rho_i c_i$ is equal to a product $\rho_o c_o$, the first radial resonance frequency will increase with an increase in the dilatational wave phase velocity $c_i$ relative to the dilatational wave phase velocity $c_o$. However, if the fluid is selected such that a product $\rho_i c_i$ is equal to a product $\rho_o c_o$, the first radial resonance frequency will decrease with a decrease in the dilatational wave phase velocity $c_i$ relative to the dilatational wave phase velocity $c_o$. Further tuning of the first radial resonance frequency can be achieved by adjusting the radial wall thickness of the elastic cylinder.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic of a pressure-field sensing array configured in accordance with the present invention;

FIG. 1A is a cross-sectional view through the array of FIG. 1;

FIG. 2 is a spatial representation of the displacement of the array's cylinder for the first radial resonance frequency thereof;

FIG. 3 is a graph of wavenumber k versus frequency $\omega$ for the fluid in the array's cylinder indicating the propagating and non-propagating regions of the wavenumber-frequency plane;

FIG. 5 is a schematic of a pressure-field sensing array having a plurality of sealed cylinder segments, each of which is tuned for a specific first radial resonance frequency in accordance with the present invention.

DESCRIPTION OF THE PREFERRED EMBODIMENT(S)

Figure 4A:
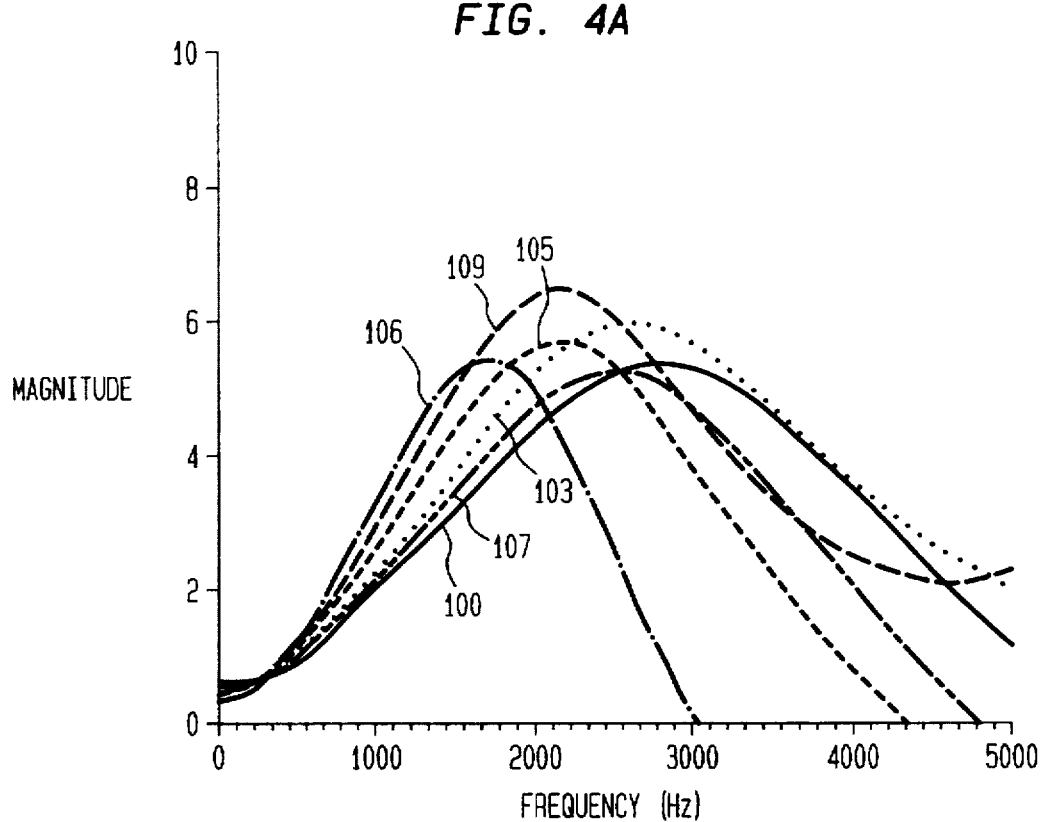
FIGS. 4A and 4B are graphs of the magnitude ratio as a function of frequency for a plurality of case simulations used to illustrate the present invention.

Referring now to the drawings, and more particularly to FIG. 1, a pressure-field sensing array is shown and is referenced generally by the numeral 10. Array 10 consists of a sealed elastic cylinder 12 filled with a fluid 14. Sealing of elastic cylinder 12 at either end thereof can be accomplished with end caps or bulkheads 16 and 18 as is known in the art. The length of cylinder 12 is not limited. Maintained within cylinder 12 are a plurality of hydrophones 20 spaced apart from one another along the length of cylinder 12. Electronics (not shown) associated with each hydrophone 20 can be included within cylinder 12 or can be maintained on a host platform, e.g., onboard a ship 30, to which array 10 is tethered. Typically, hydrophones 20 are coupled to one another via communication lines 22, and are further coupled to ship 30 over a tether/communication line 24. A cross-sectional view of towed array 10 is shown in FIG. 1A. The thickness of cylinder 12 is indicated at $T_r$. Hydrophone 20 and communication line 22 are centrally positioned in cylinder 12 and surrounded by fluid 14. In a typical scenario, array 10 is immersed in a fluid environment 50, e.g., seawater, and is towed therethrough by ship 30.

The characteristic impedance for dilatational wave (know also as compressional wave) propagation in a fluid is given by the quantity $\rho c$, where $\rho$ is the fluid density and c is the fluid dilatational wave phase velocity. The inventive method and apparatus described herein employs selective differences in the density and dilatational wave phase velocity between fluid 14 and fluid environment 50 to filter out the unwanted noise pressure fields at frequencies above the frequency of the pressure waves of interest. In other words, elastic cylinder 12 and fluid 14 function as a frequency filter. In this description, the density of fluid 14 will be designated $\rho_i$, the dilatational wave phase velocity in fluid 14 will be designated $c_i$, the density of fluid environment 50 will be designated $\rho_o$ and the dilatational wave phase velocity in fluid environment 50 will be designated $c_o$.

In order to filter the unwanted pressure fields, the present invention controls the first radial resonance frequency of cylinder 12. The first radial resonance frequency places cylinder 12 in a state of general vibration as shown in FIG. 2, where the principle displacement is radial as indicated by the vector labeled $u_r$. For impinging pressure fields at frequencies above the first radial resonance frequency, cylinder 12 exhibits decreased sensitivity. In general, the unwanted pressure fields have a broad frequency spectrum that includes frequencies above the first radial resonance frequency of a typical elastic cylinder used in towed arrays. Thus, the present invention tunes cylinder 12 in terms of its frequency sensitivity to optimize dynamic performance of the array.

The mathematical space for discussing the present invention is known as the wavenumber-frequency space or plane defined by the relationship $k=2\pi/\lambda$, where k is the wavenumber in radians/meter and $\lambda$ is the spatial wavelength of vibration. Within the wavenumber-frequency plane, the pressure field in either fluid 14 or outer fluid environment 50 is characterized by two distinct regions, the propagating and non-propagating regions. The propagating region for inner fluid 14 is contained between the lines $k=\pm\omega/c_i$ and hatched as shown at 26 in FIG. 3. In propagating region 26, the radial variation of the pressure field follows the Bessel function of the first kind, and does not undergo decay with respect to radial position within cylinder 12. The remainder of the wavenumber-frequency plane comprises the non-propagating regions 28 where $|k|>|\omega/c_i|$. Pressure fields in non-propagating regions 28 impinging on the outer surface of cylinder 12 undergo an exponential decay. The decay follows a modified Bessel function where decay varies with respect to radial position within cylinder 12.

The magnitude of the inner fluid pressure field $P_i$, normalized by the outer fluid pressure field magnitude $P_o$, is expressed in decibels (dB) according to the following equation $$10\log\left(\frac{P_i(r_1)}{P_o}\right)^2 \qquad (4)$$

where $r_1$ is the radial distance from the central longitudinal axis of cylinder 12 at which the inner pressure field is evaluated. The mathematical derivation of the dynamic response is contained in "A Closed-Form Dynamic Elasticity Solution to the Fluid/Structure Interaction Problem of a Two-Layer Infinite Viscoelastic Cylinder With Inner and Outer Fluid Loading Subject to Forced Harmonic Excitation," by M. S. Peloquin, NUWC-NPT Technical Report 11,067, Naval Undersea Warfare Center, Newport., R.I., June 1996, the contents of which are hereby incorporated by reference.

As mentioned above, the prior art attempts to match the density $\rho$ and dilatational wave phase velocity c of both fluid 14 and outer fluid environment 50 to prevent attenuation of pressure fields. However, the present invention employs selective differences between fluid 14 and outer fluid environment 50 in terms of density and dilatational wave phase velocity to filter out pressure fields that exist above the maximum frequency of the array. Such filtering is accomplished by controlling or tuning the first radial resonance frequency of cylinder 12. A reduction in the first radial resonance frequency of cylinder 12 is achieved by selecting a fluid 14 whose product $\rho_i c_i$ is less than the product $\rho_o c_o$. Reduction of the first radial resonance frequency can also be achieved when the product $\rho_i c_i$ is equal to the product $\rho_o c_o$ provided the dilatational wave phase velocity $c_i$ is less than the dilatational wave phase velocity $c_o$. Conversely, an increase in the first radial resonance frequency is achieved by selecting a fluid 14 whose product $\rho_i c_i$ is greater than $\rho_o c_o$. An increase in the first radial resonance frequency can also be achieved when the product $\rho_i c_i$ is equal to $\rho_o c_o$ provided the dilatational wave phase velocity $c_i$ is greater than the dilatational wave phase velocity $c_o$.

By way of example, if outer fluid environment 50 is seawater ($\rho_o=1026$ kg/m$^3$ and $c_o=1500$ m/sec) or fresh water ($\rho_o=998$ kg/m$^3$ and $c_o=1481$ m/sec), fluids 14 that fit the general constraints outlined above for increasing the first radial resonance frequency include, for example, glycerin, caster oil, ethanol amide, ethylene glycol, and glycerol. Examples of fluid 14 that fit the general constraints outlined above for decreasing the first radial resonance frequency include, for example, mercury, ethyl alcohol, turpentine, acetone, benzene, carbon disulfide, carbon tetrachloride, chloroform, ethanol, ethyl ether, kerosene, methanol, and nitrobenzene.

By way of further illustration, simulations were performed to show how the present invention can be used to control or tune the first radial resonance frequency over a fairly broad frequency range. The details of the simulations are discussed in the afore-mentioned Technical Report incorporated by reference and will therefore not be presented herein. Briefly, the simulations depict the dynamic response of a fluid-filled elastic cylinder immersed in a fluid environment to a pressure impinging on and normal to the outer surface of the cylinder. The exciting pressure field is a traveling wave of arbitrary wavenumber k and frequency ω and can be expressed mathematically as $$P_o e^{i(kx-\omega t)} \quad (5)$$

where x is the longitudinal coordinate coincident with the longitudinal axis of the cylinder, and t is time.

The simulations were performed for an outer fluid environment similar to water, i.e., fluid density $\rho_o=1000$ kg/m³ and dilatational wave phase velocity $c_o=1500$ m/sec. These values were held constant for all cases of the simulations. The properties of the simulated elastic cylinder were as listed below in Table 1. Typically, the elastic cylinder is made from a rubber or urethane material such as ESTANE 58881 or ESTANE 58886 available commercially from BF Goodrich. Other suitable materials include melt-process rubbers such as ALCRYN 1160, 1180 or 3155 commercially available from DuPont.

TABLE 1

Properties of Simulated Elastic (e.g., ALCRYN) Cylinder

| Property | Value/units |
| --- | --- |
| Young's Modulus | $1.0 \times 10^8$ N/m² |
| Structural Loss Factor | 0.3 |
| Density | 1070 kg/m³ |
| Poisson's Ratio | 0.4 |
| Inner Radius | 1.2 inches |
| Outer Radius | 1.5 inches |
| Radial Wall Thickness | 0.3 inches |

The first radial resonance frequency is controlled by variations in fluid density $\rho_i$ of the fill-fluid (i.e., fluid 14) and dilatational wave phase velocity $c_i$ of the fill-fluid. A number of such variations and resulting first radial resonance frequency are listed in Table 2 where Case 0 is representative of the situation where the fill-fluid matches that of the outer fluid environment, i.e., $\rho_i=\rho_o$ and $c_i=c_o$.

TABLE 2

Simulation Cases For Controlling First Radial Resonance Frequency

| Case | FIGS. 4A/4B Reference Numeral | $\rho_i$, kg/m³ | $c_i$, m/sec | $\rho_i c_i$ | First Radial Resonance Frequency, Hz |
| --- | --- | --- | --- | --- | --- |
| 0 | 100 | 1000 | 1500 | $1.5 \times 10^6$ | 2862 |
| 1 | 101 | 2000 | 3000 | $6.0 \times 10^6$ | 3140 |
| 2 | 102 | 2000 | 1500 | $3.0 \times 10^6$ | 3040 |
| 3 | 103 | 2000 | 750 | $1.5 \times 10^6$ | 2670 |
| 4 | 104 | 1000 | 3000 | $3.0 \times 10^6$ | 3090 |
| 5 | 105 | 1000 | 750 | $0.75 \times 10^6$ | 2233 |
| 6 | 106 | 500 | 750 | $0.375 \times 10^6$ | 1770 |
| 7 | 107 | 500 | 1500 | $0.75 \times 10^6$ | 2576 |
| 8 | 108 | 500 | 3000 | $1.5 \times 10^6$ | 2994 |
| 9 | 109 | 2000 | 500 | $1.0 \times 10^6$ | 2216 |
| 10 | 110 | 2000 | 1000 | $2.0 \times 10^6$ | 2876 |
| 11 | 111 | 666 | 3000 | $2.0 \times 10^6$ | 3040 |

Figure 4B:
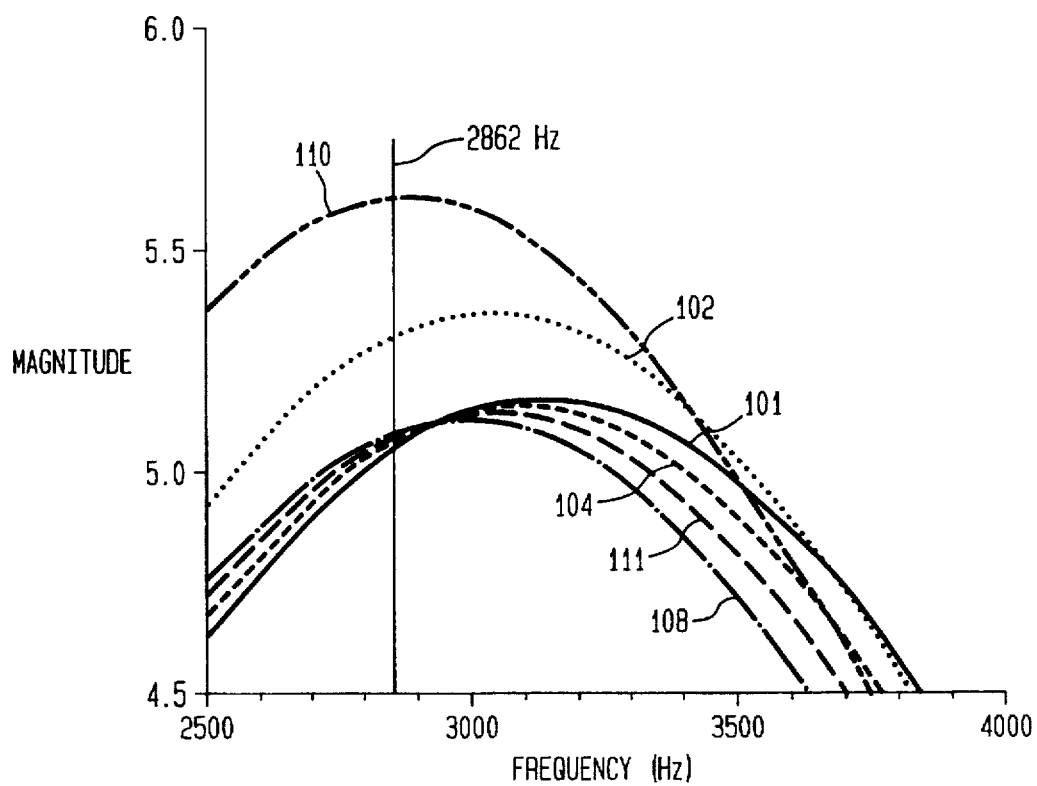

The results of the simulations are displayed graphically in FIG. 4 where the curves represent the magnitude ratio of the inner-to-outer pressure field expressed as a decibel in accordance with equation (1) recited above. Each curve is referenced by the number associated therewith as indicated in Table 2.

The goals of the present invention can also be accomplished by varying the radial wall thickness $T_r$ (see FIG. 1A) of cylinder 12 independent of the ρc relationship between fluid 14 and outer fluid environment 50. More specifically, a decrease in first radial resonance frequency is achieved by increasing radial wall thickness $T_r$. Conversely, an increase in first radial resonance frequency can be achieved by decreasing radial wall thickness $T_r$. For example, for Case 0 in Table 2, the first radial resonance frequency was 2862 Hz when $T_r=0.3$ inches. Keeping all fluid properties equal and changing $T_r$ to 0.6 inches resulted in a decrease in first radial frequency to 1960 Hz. Control of the first radial resonance frequency in this manner can also be used in conjunction with the variations in fluid 14 as described above. The advantages of the present invention are numerous. When used in a towed array immersed in a fluid environment, the elastic cylinder and its fill-fluid can be tuned for a specific first radial resonance frequency to filter out unwanted pressure field frequencies. Such tuning can be achieved by selecting a fill-fluid based on its fluid density and dilatational wave phase velocity, by varying the radial wall thickness of the cylinder or by a combination of fill-fluid choice and specified radial wall thickness. The combination of selecting a fluid 14 based on its ρ and c values along with a specified radial wall thickness $T_r$ provides great flexibility in tuning the first radial resonance frequency of a fluid-filled elastic cylinder. In this way, the cylinder and fluid act as a frequency filter that can be used, for example, in towed arrays to optimize performance thereof.

As shown schematically in FIG. 5, the present invention could also be used to construct a pressure-field sensing array 11 having a plurality of sealed elastic cylinder segments 12A, 12B, . . . . Housed within each cylinder segment is one or more hydrophones 20A, 20B, . . . . Each cylinder 12A, 12B, . . . can be tuned to a specific first radial resonance frequency. Such tuning is accomplished by selecting each cylinder's fill-fluid 14A, 14B, . . . , by adjusting the radial wall thickness of each cylinder, or by a combination of these two methods as described above.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of frequency filtering compressional wave energy, comprising the steps of:

providing an elastic cylinder;

selecting a fluid based on a fluid density $\rho_i$ and a dilatational wave phase velocity $c_i$ thereof;

filling said elastic cylinder with said fluid;

immersing said elastic cylinder so-filled in a fluid environment defined by a fluid density $\rho_o$ and a dilatational wave phase velocity $c_o$; and subjecting said elastic cylinder so-filled to a compressional wave propagating in said fluid environment, wherein a first radial resonance frequency of said elastic cylinder is controlled by said fluid density ρi and said dilatational wave phase velocity $c_i$.

2. A method according to claim 1 wherein said first radial resonance frequency increases when said fluid is selected such that a product $\rho_i c_i$ is increased relative to a product $\rho_o c_o$.

3. A method according to claim 1 wherein said first radial resonance frequency decreases when said fluid is selected such that a product $\rho_i c_i$ is decreased relative to a product $\rho_o c_o$.

4. A method according to claim 1 wherein said fluid is selected such that a product $\rho_i c_i$ is equal to a product $\rho_o c_o$, and wherein said first radial resonance frequency increases with an increase in said dilatational wave phase velocity $c_i$ relative to said dilatational wave phase velocity $c_o$ while maintaining said product $\rho_i c_i$ equal to said product $\rho_o c_o$.

5. A method according to claim 1 wherein said fluid is selected such that a product $\rho_i c_i$ is equal to a product $\rho_o c_o$, and wherein said first radial resonance frequency decreases with a decrease in said dilatational wave phase velocity $c_i$ relative to said dilatational wave phase velocity $c_o$ while maintaining said product $\rho_i c_i$ equal to said product $\rho_o c_o$.

6. A method according to claim 1 further comprising the step of adjusting a radial wall thickness of said elastic cylinder, wherein said first radial resonance frequency decreases with an increase in said radial wall thickness and wherein said first radial resonance frequency decreases with an increase in said radial wall thickness.

7. A method of frequency filtering compressional wave energy, comprising the steps of:

selecting an elastic cylinder having a specified radial wall thickness;

filling said elastic cylinder with a fluid;

immersing said elastic cylinder so-filled in a fluid environment; and subjecting said elastic cylinder so-filled to a compressional wave propagating in said fluid environment, wherein said first radial resonance frequency is controlled by said specified radial wall thickness.

8. A method according to claim 7 wherein said fluid environment is defined by a fluid density $\rho_o$ and a dilatational wave phase velocity $c_o$, said method further comprising the step of selecting said fluid based on a fluid density $\rho_i$ and a dilatational wave phase velocity $c_i$ thereof, wherein said first radial resonance frequency increases when said fluid is selected such that a product $\rho_i c_i$ is increased relative to a product $\rho_o c_o$.

9. A method according to claim 7 wherein said fluid environment is defined by a fluid density $\rho_o$ and a dilatational wave phase velocity $c_o$, said method further comprising the step of selecting said fluid based on a fluid density $\rho_i$ and a dilatational wave phase velocity $c_i$ thereof, wherein said first radial resonance frequency decreases when said fluid is selected such that a product $\rho_i c_i$ is decreased relative to a product $\rho_o c_o$.

10. A method according to claim 7 wherein said fluid environment is defined by a fluid density $\rho_o$ and a dilatational wave phase velocity $c_o$, said method further comprising the step of selecting said fluid based on a fluid density $\rho_i$ and a dilatational wave phase velocity $c_i$ thereof such that a product $\rho_i c_i$ is equal to a product $\rho_o c_o$, wherein said first radial resonance frequency increases with an increase in said dilatational wave phase velocity $c_i$ relative to said dilatational wave phase velocity $c_o$ while maintaining said product $\rho_i c_i$ equal to said product $\rho_o c_o$.

11. A method according to claim 7 wherein said fluid environment is defined by a fluid density $\rho_o$ and a dilatational wave phase velocity $c_o$, said method comprising the step of selecting said fluid based on a fluid density $\rho_i$ and a dilatational wave phase velocity $c_i$ thereof such that a product $\rho_i c_i$ is equal to a product $\rho_o c_o$, wherein said first radial resonance frequency decreases with a decrease in said dilatational wave phase velocity $c_i$ relative to said dilatational wave phase velocity $c_o$ while maintaining said product $\rho_i c_i$ equal to said product $\rho_o c_o$.

12. A frequency filter for compressional wave energy comprising:

an elastic cylinder immersed in a fluid environment having compressional waves propagating therein, said fluid environment defined by a fluid density $\rho_o$ and a dilatational wave phase velocity $c_o$; and a fluid filling said elastic cylinder wherein said fluid is chosen based on a fluid density $\rho_i$ and a dilatational wave phase velocity $c_i$ thereof, wherein a first radial resonance frequency of said elastic cylinder is controlled by said fluid density $\rho_i$ and said dilatational wave phase velocity $c_i$ relative to said fluid density $\rho_o$ and said dilatational wave phase velocity $c_o$.

13. A frequency filter as in claim 12 wherein said fluid is chosen to define a product $\rho_i c_i$ that is greater than a product $\rho_o c_o$, and wherein said first radial resonance frequency increases as said product $\rho_i c_i$ increases.

14. A frequency filter as in claim 12 wherein said fluid is chosen to define a product $\rho_i c_i$ that is less than a product $\rho_o c_o$, and wherein said first radial resonance frequency decreases as said product $\rho_i c_i$ decreases.

15. A frequency filter as in claim 12 wherein said fluid is chosen to define a product $\rho_i c_i$ that is equal to a product $\rho_o c_o$, and wherein said first radial resonance frequency increases with an increase in said dilatational wave phase velocity $c_i$ relative to said dilatational wave phase velocity $c_o$ while said product $\rho_i c_i$ is maintained equal to said product $\rho_o c_o$.

16. A frequency filter as in claim 12 wherein said fluid is chosen to define a product $\rho_i c_i$ that is equal to a product $\rho_o c_o$, and wherein said first radial resonance frequency decreases with a decrease in said dilatational wave phase velocity $c_i$ relative to said dilatational wave phase velocity $c_o$ while said product $\rho_i c_i$ is maintained equal to said product $\rho_o c_o$.

17. A frequency filter for compressional wave energy comprising:

an elastic cylinder immersed in a fluid environment having compressional waves propagating therein;

a fluid filling said elastic cylinder; and said elastic cylinder having a specified radial wall thickness wherein a first radial resonance frequency of said elastic cylinder is controlled by said specified radial wall thickness, said first radial resonance frequency decreasing when said specified radial wall thickness is increased and said first radial resonance frequency increasing when said specified radial wall thickness is decreased.

18. A pressure-field sensing array comprising:

an elastic cylinder having a central longitudinal axis, said elastic cylinder having at least one sealed segment;

at least one hydrophone in each said sealed segment; and a fluid filling each sealed segment, said fluid being chosen based on a fluid density $\rho_i$ and a dilatational wave phase velocity $c_i$ thereof to control a first radial resonance frequency for that sealed segment.

19. A pressure-field sensing array as in claim 18 wherein each sealed segment has a specified radial wall thickness for further controlling said first radial resonance frequency thereof.

20. A pressure-field sensing array as in claim 18 wherein said elastic cylinder is divided into a plurality of sealed segments.

\* \* \* \* \*